United States Patent [19]

Risgin

[11] 3,715,288

[45] Feb. 6, 1973

[54] METHOD OF FABRICATING FILM-TYPE SENSING STRUCTURES

[75] Inventor: Ojars Risgin, Grass Lake, Mich.

[73] Assignee: Sensors, Inc.

[22] Filed: Nov. 10, 1970

[21] Appl. No.: 88,369

[52] U.S. Cl. ..................204/38 A, 204/58, 204/140.5

[51] Int. Cl. .........C23b 9/02, C23f 17/00, C23b 3/10

[58] Field of Search ......204/38 A, 58, 141, 140.5, 15

[56] References Cited

UNITED STATES PATENTS 3,607,680 9/1971 Uno et al. ................................204/15

3,307,974 3/1967 Davis.................................204/38 A

*Primary Examiner*—John H. Mack

*Assistant Examiner*—R. L. Andrews

*Attorney*—Shanley & O'Neill

[57] ABSTRACT

A unique film-type, radiation sensing structure and method of manufacture in which a high strength, electrically insulating, thin, support film having low heat capacity and low heat conductivity is formed so as to be unitary with a backing material by selective anodizing of an aluminum blank and etching away aluminum backing. The thin film can be heated to permit the type of vapor deposition which makes practicable use of semi-conductor radiation sensing materials e.g. to form a hot junction of a thermocouple. A novel conically shaped cavity film support provides ideal absorber structure.

19 Claims, 11 Drawing Figures

Figure 2:
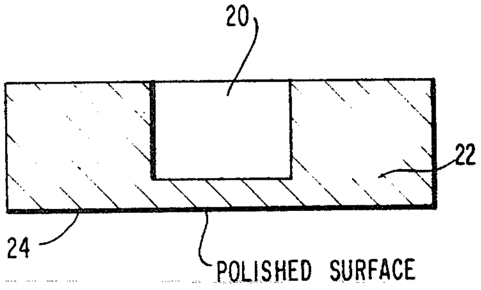

INVENTOR
OJARS RISGIN

BY Shanley & O'Neil
ATTORNEYS

METHOD OF FABRICATING FILM-TYPE SENSING STRUCTURES

This invention is concerned with thin film-type radiation sensing structures and methods of manufacture.

The teachings of the invention are specifically applicable to radiation sensing thermocouples or thermopiles, and their manufacture, and will be described in that environment.

With such devices, the temperature rise caused by radiation is sensed by a junction (thermocouple detector) or a series of junctions (thermopile detector). Practical advantages of this type of detector include room temperature operation, some responsiveness to differing lengths of radiation, and a direct signal voltage without need for a bias voltage supply. However, some distinct disadvantages of past film-type thermocouples which have limited their usage are: fragile structure, slow speed of response to changing radiation, and lack of a uniform response to differing wave lengths of radiation. These disadvantages are eliminated or substantially alleviated by the present invention.

Examples of prior art structures are shown in the patents to Villers U.S. Pat. No. 3,483,045 and Stevens et al. U.S. Pat. No. 3,405,272. Typically a thin plastic film material is adhesively attached to the backing metal and bridges a recess therein. Or, a thin supporting film of aluminum oxide is affixed around an opening in the aluminum heat sink by epoxies or adhesive resins. While such structures can be satisfactory for certain uses, assembly costs and the difficult manufacturing procedures are obvious disadvantages. Also suitable uses for such structures are limited because of their fragile structure. Less obvious perhaps are the disadvantages related to both manufacture and use which stem from the adhesives. The adhesives are likely to decompose in manufacture or use and contaminate the coating process or the sensing operation.

A specific embodiment of the present invention provides an adhesive-free thin film of very low mass, low heat capacity and low heat conductivity. Also, use of high thermoelectric power semi-conductor materials is made practicable because a thin film in accordance with the present invention can be subjected to various treatments, including heat treatments during deposition of the materials, without degradation of the film in any way.

Instead of using plastic or other foils or films adhesively attached, or otherwise made to adhere, to a backing metal, the present invention teaches the formation of a unitary film with and from the backing material. In a specific embodiment amorphous aluminum oxide ($Al_2O_3$) is produced in a hard coat electrolytic anodizing process working with substantially pure aluminum. Other backing materials and films are within the scope of the invention. For example, aluminum alloys, tantalum, silicon and other materials having suitable heat and electrical conduction properties and which form coating layers of suitable properties such as high strength, low heat conductivity, and electrically insulating. Such coating layers will generally be formed by oxidation, however, suitable coating layers can be formed by other chemical reactions. Unusual contributions stem from these teachings of the invention on forming of a coating layer and from teachings relating to implementation of such process to arrive at a thin, high strength unitary support film for radiation sensing material.

An electrolytic anodizing approach to formation of the coating layer will be utilized in describing a specific embodiment. In this process thickness of the anodized layer can be controlled by the voltage supplied during anodizing. Unlike the usual anodized coatings on aluminum for protection or decorative purposes, a barrier-type oxide coating is taught herein. This type of coating is formed in an electrolyte with little or no capacity to dissolve the oxide layer. The result is non-porous (pinhole-free), dense, and hard surface layer.

Several processes are taught for removal of backing after anodizing so that a thin hard film bridging a recess in the metal backing is exposed without possibility of damage to the film. This film is unitary, that is, one with the metal, around its entire periphery, rather than being made integral by adhesives as in the prior art. Because the aluminum oxide is an amorphous form, not crystalline, the thermal conductivity is low. With this film, a hot thermocouple junction, e.g., is more likely to lose absorbed heat by radiation.

Thermoelectric materials are evaporated onto the thin unitary film formed by chemical reaction at the surface of the support blank. Semi-conducting materials of high molecular weight having the advantages of high thermoelectric power, low thermal conductivity, and high electrical conductivity are preferred. Examples are bismuth telluride, lead telluride, lead selenide, and the like. While these materials have good inherent electrical characteristics, evaporated films of these materials have not been successfully applied in the past in film-type sensors. Weaknesses in the physical characteristics of the prior art structures placed limitations on the vapor deposition process. Because of this it is felt that degradation of electrical properties of the semi-conductor materials resulted and excessive electrical noise, low thermoelectric power, an high electrical resistance were experienced. Such faults are believed to be traceable to imperfect crystallinity of the thermoelectric coatings and to barrier layers between crystalline boundaries.

One specific disadvantage of the thin film substrates of the prior art is that they cannot be heated sufficiently, especially in a vacuum. The substrate materials or the adhesives, or both, were not sufficiently temperature stable; e.g. melting occurred or they decomposed with an evolution of gas spoiling any vacuum process. Contrary to that experience, unitary films, such as the aluminum oxide film of the present invention, are extremely stable and can be heated to the proper temperature for deposition of semi-conductor layers of high quality without damage to the substrate or without degradation of the vacuum. Also, enhanced thermoelectric properties result. Further, the dynamic range for a sensor of the present invention is considerably increased over the prior art structure. Because of high temperature stability it can be used to measure high power sources, such as $CO_2$ lasers.

That the films formed in the course of the present invention need not be flat is another unique contribution. To improve the absorption of radiation the receiver may be shaped in the form of a black body cavity, e.g. conical. The advantage of the cone (and similar cavity shapes) is that the cone will absorb radiation of all wavelengths almost perfectly, even if coated on the inside with an imperfect absorbing material. Therefore a thermopile made with a conical collector would be a truly standard detector whose electrical output would depend only on the radiant power entering the cone (or similar cavity) and not on spectral distribution of the incident radiation. This property becomes more significant with longer wavelengths (beyond ten micrometers) where the absorption by black, substantially flat, layers begins to decrease.

In brief, major advantages of the invention include: greater ruggedness because of both the inherent strength of the film and because the film is unitary with its frame, greater ease of manufacture and consequent lower production costs, the capability of producing thin-film support in a wide variety of configurations, the capability of satisfactorily depositing semi-conductor materials having better thermoelectrical characteristics, and the production of wider range sensors of great temperature stability than previously available.

Figure 1:
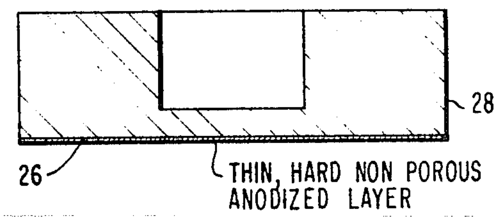
Figure 3:
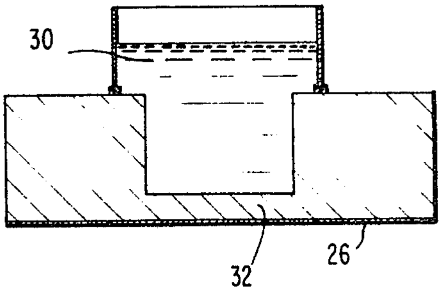
Figure 4:
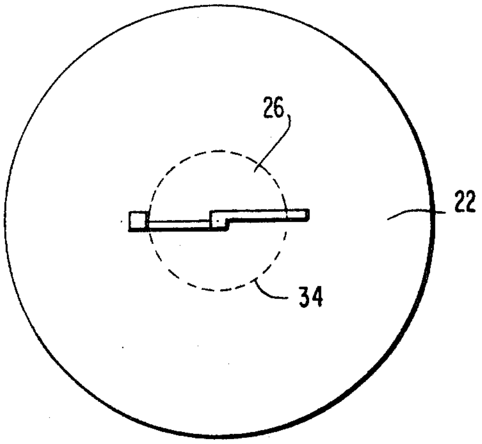
Figure 5:
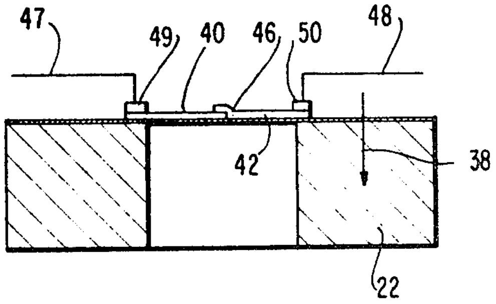
Figure 6:
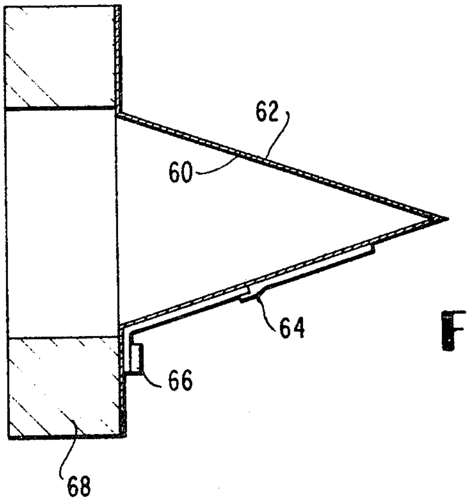
Figure 7:
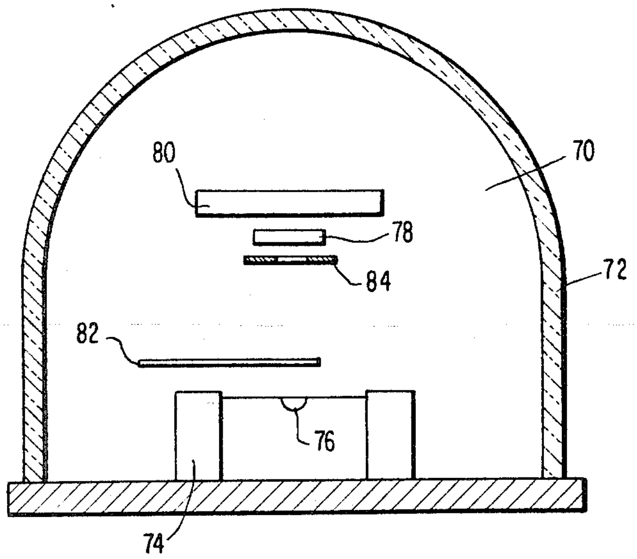
Figure 8:
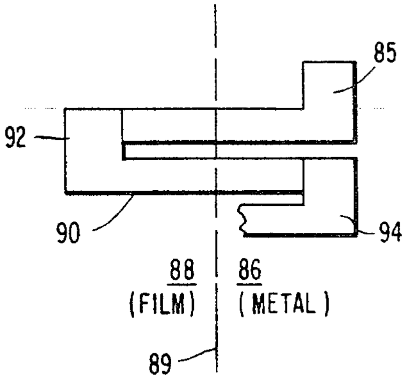
Figure 9:
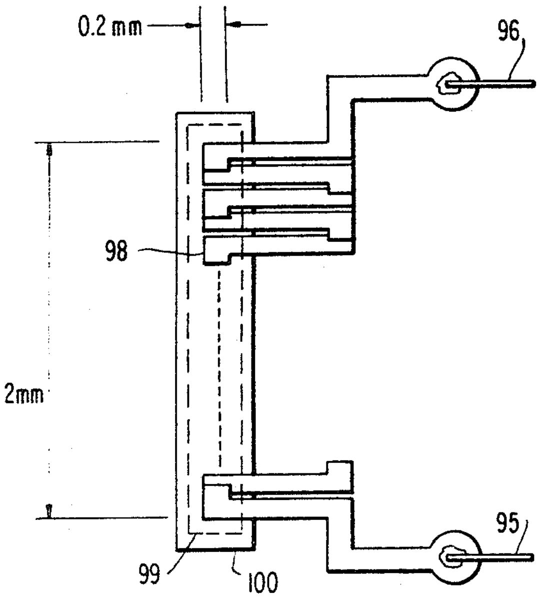
Figure 10:
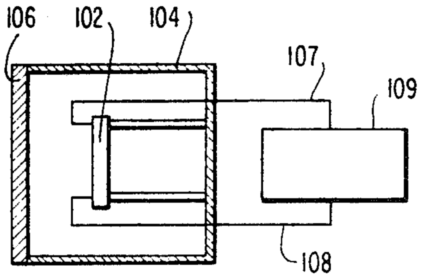
Figure 11:
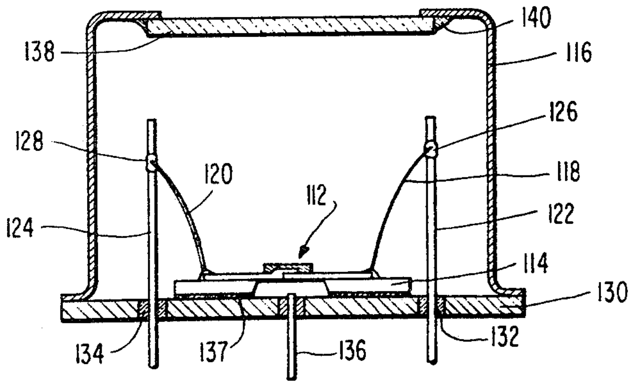

These advantages and others will be more clear from a detailed description of representative embodiments. The accompanying drawings are illustrative of the unique structure and methods of manufacture taught by the invention. In these drawings:

FIGS. 1, 2 and 3 are schematic cross-sectional views of a metal blank being processed in accordance with the teachings of the invention, FIG. 4 is a top plan view of sensing structure embodying the invention, FIG. 5 is a schematic cross-sectional view of sensing structure embodying the invention, FIG. 6 is a schematic cross-sectional view of a conical embodiment of the invention, FIG. 7 is a schematic cross-sectional view of vacuum coating apparatus for carrying out teachings of the invention, FIG. 8 is a schematic view of a portion of a sensing device showing thermocouple junction structure in accordance with the invention, FIG. 9 is a schematic plan view of sensing structure embodying the invention, FIG. 10 is a schematic cross-sectional view of a sensing device embodying the invention, and FIG. 11 is a cross-sectional view of a specific embodiment of the invention.

In carrying out the invention a suitable metal such as aluminum is shaped by punching, drawing, machining, cutting, and/or forging. In the specific embodiment of FIG. 1, cavity 20 is formed in metal blank 22. Exterior surface 24 is polished to a high degree. Mechanical polishing and electrolytic-polishing are taught. The object is to produce an extremely smooth surface avoiding pores or a reentrant type surface.

After shaping as desired and polishing of surface 24, the polished surface is anodized to form a thin, hard, barrier-type anodized layer 26.

In a typical thermopile application, the overall thickness of the metal blank measured along side wall 28 would be between about one-sixteenth and one-eighth inch. The metal blanks can be fabricated from sheet stock aluminum with recessed portions formed, e.g. before anodizing. The blanks are generally cut from the sheet stock before anodizing but can be cut after anodizing, depending on the cutting apparatus, if mechanical damage to the surface can be avoided. Suitable thicknesses for anodized layer 26 are from about 1/10 micron up to about 1 micron.

A desirable type of anodized layer can be made in dilute solutions of ammonium citrate plus citric acid or ammonium tartrate plus tartaric acid at a pH of about five. A typical electrolytic includes distilled water and 0.5 grams per liter of ammonium citrate plus 0.5 grams per liter of citric acid. The object is to avoid establishing porosity in the oxide layer due to erosion by the electrolyte solution.

The thickness of the film formed on the aluminum is determined by the anodizing potential used, with approximately 13.5 angstroms of thickness being developed with a volt of anodizing potential. It should be noted that a chemically formed unitary support film can be made in other ways than electrolytic anodizing and can be made from metals other than aluminum.

The coating can be carried out by anodizing the entire object or only the surface 24. When the entire object is anodized, the anodized covering at the bottom surface of the recess or a portion thereof, must be removed. This can be done by abrading such surface or, with a hydroxide etchant such as concentrated potassium hydroxide.

As shown in FIG. 3, with the metal surface of the recess 20 exposed, an etchant 30 which is not harmful to coating layer 26, is used to remove the backing metal 32. A typical example of such an etchant is 25 percent hydrochloric acid solution. What remains, an oxide film, is unitary with the metal blank. As is more evident from FIG. 4, this film is supported around its entire periphery.

Referring to FIG. 5, because of the extreme thinness and high strength of the type of layer which can be formed in accordance with the present invention, a thermocouple can be manufactured with a film which is more likely to lose heat by radiation. At the same time the unitary film maximizes the heat contact along the direction indicated by the arrow 38 because of its intimate contact and because the need for the thermally insulating adhesive layer of the prior art is not present. Also, because of the good electrical insulation properties of the oxide layer, effective electrical insulation is provided to prevent a short circuit at the heat sink 22.

In forming a thermocouple junction, a layer 40 of thermoelectric material extends from the film onto the heat sink 22 and, a layer 42 of a differing thermoelectric material, extends from the film supported layer 44 toward another portion of the heat sink 22. Hot junction 46 is formed on the thin film. Leads 47 and 48 connect the thermoelectric materials to a measuring instrument such as a suitably sensitive galvanometer (not shown). Lead attachment metals, such as silver, gold, or indium, are evaporated on the thermoelectric at the lead contact areas 49, 50. Leads are attached by soldering, conductive metal cement, or similar semi-conductor device manufacturing methods. Fine metal wires, e.g. gold, are used for leads 47 and 48.

Film-type sensors of the prior art were limited, as described above, and did not provide the unique configurations, i.e. the configurations other than planar, made possible by the present invention. Such non-planar shaping of the oxide layer, e.g. cavity configurations can be widely diversified because of the inventive concepts. Non-planar configurations bring about unique contributions including the ability to manufacture one of the most efficient types of radiation absorbers, a conical cavity as shown in FIG. 6. The interior surface 60 can be coated with material, such as lamp black, platinum black, or gold black to enhance absorption. This provides the characteristic "black body cavity" absorption especially suited for accurate sensing of radiation containing varying wave lengths and, provides in effect, an ideal absorber.

Referring to FIG. 6, the conically shaped oxidized layer 62 supports thermoelectric materials forming, for example, hot junction 64. Cold junction 66 is supported on heat sink 68 as shown in FIG. 6.

The dimensional characteristics, that is, thickness of the conical oxide layer formed and the heat sink shown in FIG. 6, can be as described earlier in relation to FIG. 5. A plurality of hot and cold junctions positioned around the cone can be connected for forming a thermopile.

Suitable thermoelectric materials include bismuth and antimony which have been used in the prior art. And, among the semi-conductor materials made practicable by the present invention, suitable thermoelectric materials include lead telluride, and the like. The semi-conductor materials are preferred because of their higher thermoelectric power and lower thermal conductivity. However, as covered earlier, prior art structures and techniques for manufacturing film type thermal sensing devices had, for practical purposes, substantially excluded use of semi-conductor thermoelectric materials. It is believed that the limitations placed on the deposition process by such prior art accounted for the high electrical resistance and high noise level experienced. However, with the unitary, strength structure of the present invention, which does not rely on an adhesive for holding a film to the metal backing, deposition of semi-conductor materials can be carried out at high temperatures with both the film and metal blank being heated. As a result the prior art high resistance, high noise problems experienced with semi-conductor thermoelectric materials are substantially eliminated by the invention.

Referring to FIG. 7, apparatus is shown for carrying out a vapor deposition operation. The chamber 70, within bell 72, is evacuated. A furnace structure 74 includes two boats, such as 76, for holding thermoelectric materials. The furnace is heated by resistance heated, electron bombardment, or the like. The object to be coated is located at 78 and a heater 80 maintains it at desired temperature. A shutter 82 is located between the source of metal and the object to be coated to control flow of metal. A mask 84 is provided in close juxtaposition to the object to be coated. Mask 84 controls the configuration of the applied coating.

Where a plurality of coatings are to be applied, a mask will be used in a selective position while one of the materials to be coated is heated in its receptacle. After the desired thickness coating of that material is applied, the mask is shifted and a second material is heated and vapor deposition of desired weight and configuration takes place. A plurality of masks may also be used. Also under certain circumstances photo-etching could be used to obtain selective surface coating.

FIG. 8 shows an enlarged partial view of the result of the masking and vapor deposition operation. A first thermoelectric material 85 is applied and extends between the metal 86 and the thin film 88; dividing line 89 indicates the separation between metal and film. In the masking operation a second thermoelectric material 90 is applied overlapping the first material, as shown, to form a hot junction 92 on the film. A cold junction 94 is formed on the metal blank where the two materials overlap, etc.

Multiple aperture masks are used so that multiple junction thermocouples can be made in a two coating step operation. FIG. 9 shows the results of such thermopile fabrication. In the specific embodiment illustrated, 20 junctions are formed over a 2 millimeter distance. The junctions are connected in series and through leads 96 and 98 to a suitable meter (not shown). The hot junctions 98 on the thin film are covered with a suitable radiation absorbent material, such as a lamp black layer, shown by dash-line 99. The boundaries of the etched portion of the thin film are shown by solid line 100.

FIG. 10 shows a typical thermoelectric circuit in which detector element 102 is housed within chamber 104 with a radiation transmitting window 106. The leads 107 and 108 are typically connected to a meter or amplifier means 109. Chamber 104 can be evacuated for certain embodiments or can be filled with an inert gas, such as argon. The structure can be fabricated to a standard dimension package, e.g. a JEDEC TO-5 transistor package.

The detector element in accordance with the present invention can be supported on a suitable probe with or without a protective chamber and evacuation. Suitable materials for a protective window for non-evacuated chamber protection of the element include potassium bromide, polyethylene film or a zinc sulfide crystal or compact.

Details of a specific embodiment in which a sensing device is mounted in a standard intermediate size transistor package (TO-5) are shown in FIG. 11. Thin film radiation sensing structure 112 (with absorbent coating) is mounted on support structure 114 within container packaging 116. Fine highly-conductive wires 118, 120 connect the sensing materials to signal leads 122, 124, at solder joints 126, 128, respectively. Signal leads 122, 124, where they pass through case seal 130 are surrounded by glass insulated seals 132, 134. A case ground lead 136 is electrically connected to the case seal 130. Support structure 114 is joined to case seal 130 by thermally conductive cement 137.

Radiation transmitting window 138 is joined to the container packaging 116 by suitable cement 140. The overall dimension can be made to conform to substantially any standardized transistor part, or the like. Control of enclosure atmosphere e.g. vacuum or inert gas, can be readily provided.

In fabricating a sensing device in accordance with the teachings of the invention, a preshaped blank can be treated, e.g. anodized, on one surface only or over its entire surface. If anodized over its entire surface, the anodized layer is selectively removed by abrasion or with an etchant. The exposed backing metal is then removed by a process such as etching, photo-etching chemical milling, or photochemical milling. Such processes may also be used for selective area removal of the anodized layer.

In addition to electrolytic anodizing of aluminum and aluminum alloys to join a coating layer, a unitary film for supporting sensing material can be formed by other methods and from other than oxide coating layers. For example, plasma anodizing can be used to form $Al_2O_3$ and AlN films on aluminum and to form $Ta_2O_3$ on tantalum. A $SiO_2$ layer can be thermally oxidized on silicon; also a silicon nitride layer ($Si_3N_4$) can be formed by chemical reaction at the surface of the silicon backing. Silicon under certain circumstances can have advantages because of its thermal conductivity and semi-conductor electrical properties.

In describing the invention specific materials, methods, steps and configurations have been set forth. Modifications of these are possible in the light of the present disclosure. Therefore, in determining the scope of the present invention reference should be made to the accompanying claims:

I claim:

1. Method for manufacturing thermal sensing structure comprising shaping an aluminum metal blank to define a cavity, anodizing the metal blank to form an anodized layer of predetermined thickness, exposing the anodized layer on opposed interior and exterior surfaces of the cavity, such exposed anodized layer being supported by and unitary with the remainder of the metal blank about its entire periphery, and depositing thermoelectric materials on the exposed anodized layer and the metal blank in a predetermined manner with overlapping portions of the thermoelectric materials forming thermocouple junctions.

2. The method of claim 1 including the step of polishing an exterior surface of the cavity prior to anodizing and in which the polishing step includes electropolishing to form a smooth, non-reentrant surface.

3. The method of claim 1 in which the cavity has a conical configuration.

4. The method of claim 1 including the step of enclosing the thermal sensing structure in a chamber of predetermined atmospheric character.

5. The method of claim 1 in which the entire metal blank is anodized and the anodized layer on the interior surface of the cavity of the metal blank is exposed by removing at least a portion of the anodized layer from the internal surface of the cavity, and removing remaining backing metal from such internal surface of the cavity by a process selected from the group consisting of etching, photoetching, chemical milling, and photochemical milling.

6. The method of claim 5 in which the cavity has a conical configuration and in which the interior surface of the conical cavity is covered with a radiation absorbent material, such as lamp black, after removal of backing metal from the internal surface of the cavity.

7. Method for fabricating film-type sensing structure comprising the steps of treating a pre-shaped blank selected from the group consisting of aluminum and aluminum alloys on at least one surface by anodizing to form a high strength, electrically insulative coating, the coating comprising an anodized layer formed from material of the blank, removing blank-material backing from the coating over a prescribed area to leave an exposed, thin film supported about its entire periphery by and unitary with the remaining blank material and spanning a recess in the blank, and depositing thermal sensing material on the peripherally supported film.

8. The method of claim 7 including the step of heating the supported film prior to depositing the thermal sensing material.

9. The method of claim 7 in which the anodizing is carried out in a weak acid solution substantially non-erosive of the anodized layer to form a hard, substantially pore-free anodized layer.

10. The method of claim 7 in which a plurality of thermal sensing materials are deposited on the peripherally supported film to form a thermoelectrical junction.

11. Method for fabricating film-type sensing structure comprising the steps of treating a metal blank anodically to form an oxide layer, removing metal backing from the oxide layer over a prescribed area to leave an exposed, unitary, oxide layer supported about its entire periphery by the remaining metal blank, depositing radiation sensing material on the peripherally supported oxide layer the radiation sensing material comprising semi-conductor materials deposited in separate layers to form a thermocouple junction.

12. The method of claim 11 including the step of heating the thin-film, peripherally-supported, oxide layer prior to depositing the radiation sensing material.

13. The method of claim 11 in which the radiation sensing material is deposited by vapor deposition.

14. The method of claim 11 in which the separate layers of semi-conductor thermoelectric material are deposited in partially overlapping relationship to form a plurality of hot junctions on the supporting film and a plurality of cold junctions on the metal blank, the hot junctions and cold junctions being interconnected to form thermopile means.

15. The method of claim 14 in which the hot junctions are coated with a thermal radiation absorbent material.

16. The method of claim 11 in which the metal blank comprises aluminum and the oxide layer is formed by anodizing to produce a coating between about one tenth of a micron and about one micron in thickness.

17. The method of claim 16 in which the anodizing is carried out in electrolyte solution which is substantially non-erosive of the oxide layer.

18. The method of claim 11 including the step of preshaping the metal blank to form a recessed area prior to treatment.

19. The method of claim 18 in which the metal blank comprises aluminum including the step of polishing an exterior surface of the aluminum blank including an electropolishing step prior to treatment to form a smooth surface for conversion into a pin-hole free oxide layer.

* * * * *